(12) United States Patent
Yun et al.

(10) Patent No.: US 8,583,178 B2
(45) Date of Patent: Nov. 12, 2013

(54) MOBILE TERMINAL, DISPLAY DEVICE AND CONTROLLING METHOD THEREOF

(75) Inventors: Chanphill Yun, Seoul (KR); Woongchang Kim, Seoul (KR); Sunryang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 164 days.

(21) Appl. No.: 13/027,888

(22) Filed: Feb. 15, 2011

(65) Prior Publication Data

US 2012/0088549 A1     Apr. 12, 2012

(51) Int. Cl.
H04B 1/00         (2006.01)

(52) U.S. Cl.
USPC ............. 455/557; 455/556; 345/1.1; 345/2.1; 345/2.2; 345/2.3; 345/3.1; 345/5

(58) Field of Classification Search
USPC ............. 455/557, 566; 345/1.1, 2.1, 2.2, 2.3, 345/3.1, 5
See application file for complete search history.

(56) References Cited

U.S. PATENT DOCUMENTS

| | | | | |
|---|---|---|---|---|
| 6,385,770 B1 * | 5/2002 | Sinander | ........................ | 717/170 |
| 6,633,759 B1 * | 10/2003 | Kobayashi | ..................... | 455/419 |
| 7,562,358 B2 * | 7/2009 | Bennett et al. | ................. | 717/170 |
| 8,151,021 B1 * | 4/2012 | Glade et al. | ...................... | 710/62 |
| 8,244,179 B2 * | 8/2012 | Dua | .............................. | 455/41.2 |
| 2002/0144256 A1 * | 10/2002 | Budhiraja et al. | ............. | 717/174 |
| 2006/0258342 A1 * | 11/2006 | Fok et al. | .................... | 455/414.1 |
| 2007/0169083 A1 * | 7/2007 | Penubolu et al. | ............. | 717/168 |
| 2008/0295088 A1 * | 11/2008 | Bhat et al. | ...................... | 717/170 |
| 2009/0300137 A1 * | 12/2009 | Tyhurst et al. | ................ | 709/217 |
| 2009/0300596 A1 * | 12/2009 | Tyhurst et al. | ................ | 717/173 |

FOREIGN PATENT DOCUMENTS

| | | |
|---|---|---|
| EP | 1 170 922 A1 | 1/2002 |
| EP | 1 553 794 A1 | 7/2005 |
| KR | 10-2010-0051900 A | 5/2010 |
| KR | 10-2010-0081576 A | 7/2010 |

\* cited by examiner

*Primary Examiner* — Charles Shedrick
(74) *Attorney, Agent, or Firm* — Birch, Stewart, Kolasch & Birch, LLP

(57) ABSTRACT

The mobile terminal has a memory unit configured to store a software, a first display unit configured to display a first screen image generated by a first version of the software, and an interface unit configured to be connected to an external display device having a second display unit. A controller is configured to display the first screen image corresponding to the software of a first version on the first display unit when the software is executed, and to control a second screen image corresponding to the first image, according to the software of a second version to be displayed on the second display unit when the interface unit is connected to the external display device, the second image generated by a second version of the software. Accordingly, a user is able to experience different versions of software simultaneously.

19 Claims, 11 Drawing Sheets

FIG. 5
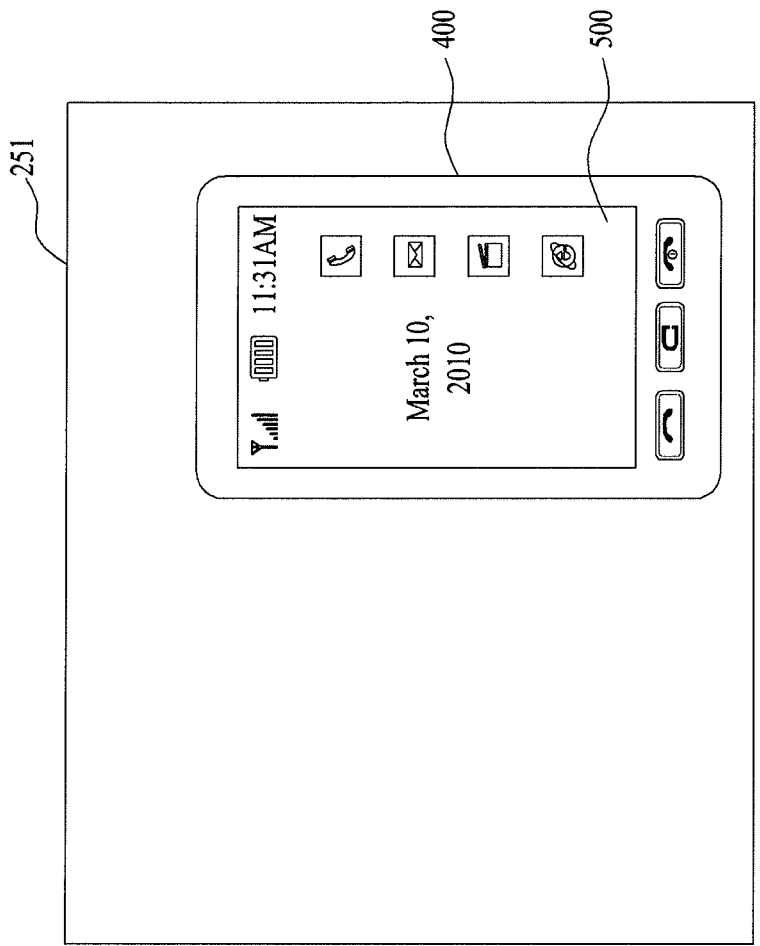
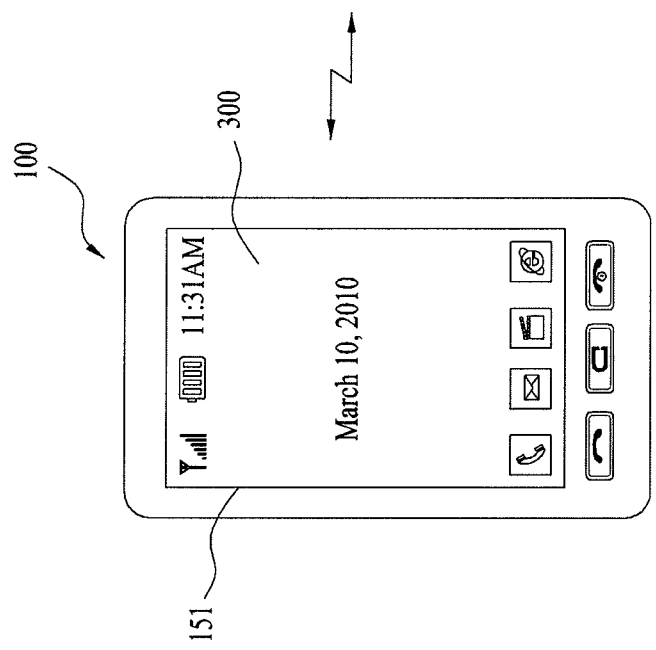

FIG. 7
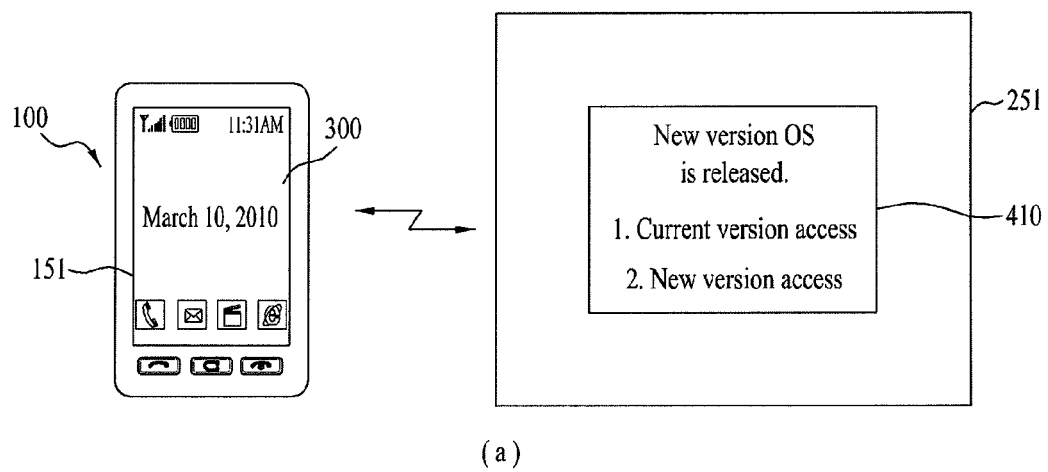
(a)
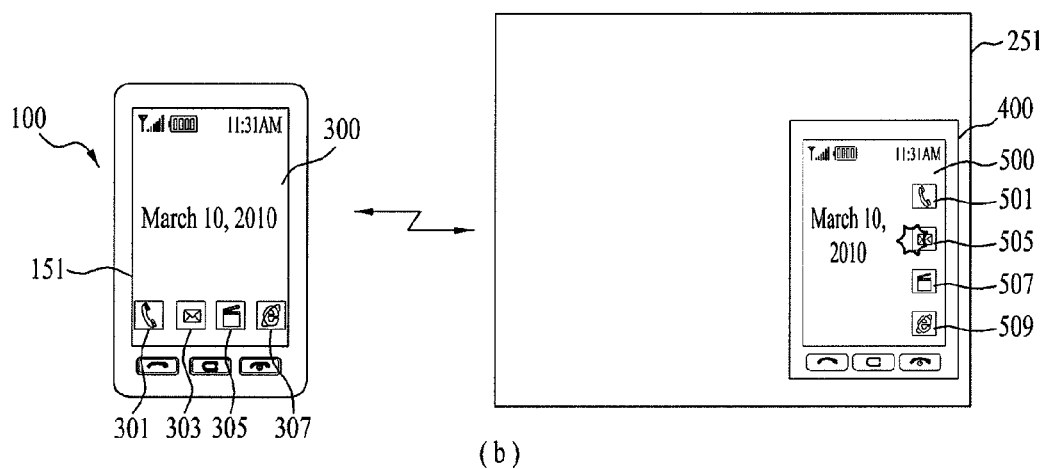
(b)
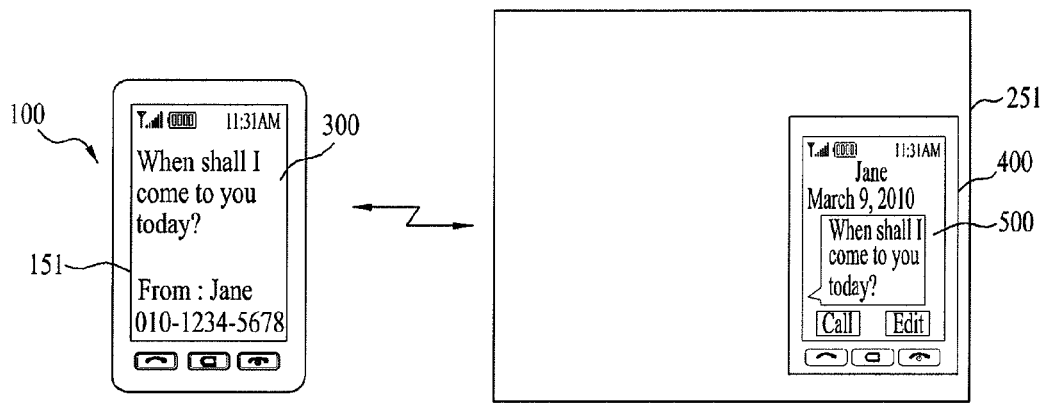
(c)

FIG. 8
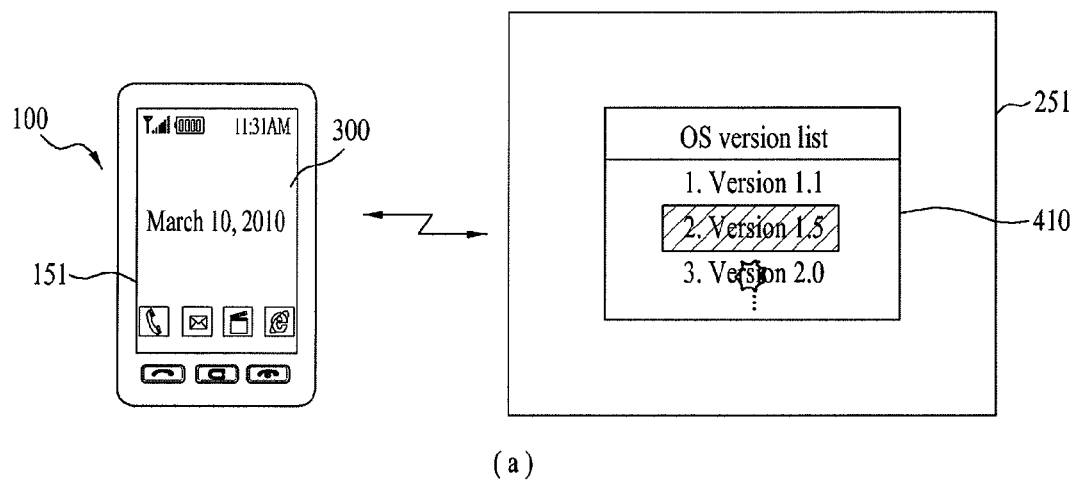
(a)
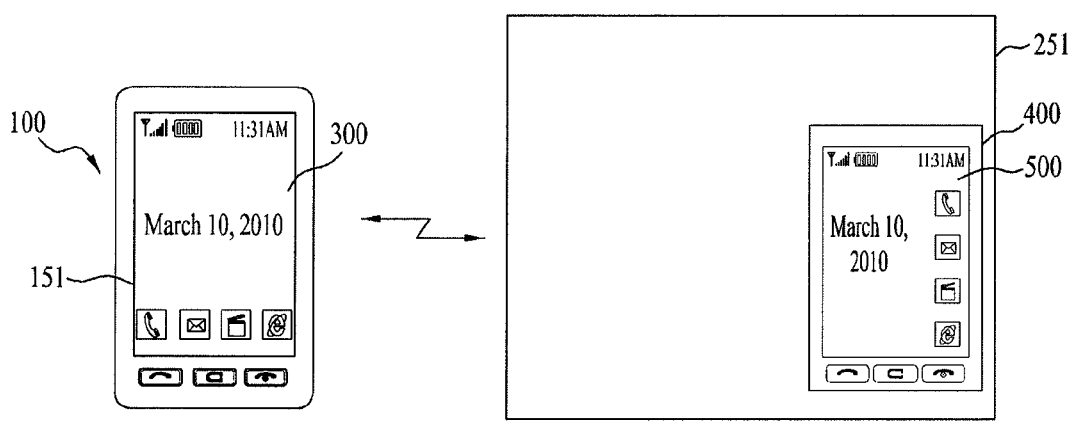
(b)

FIG. 11
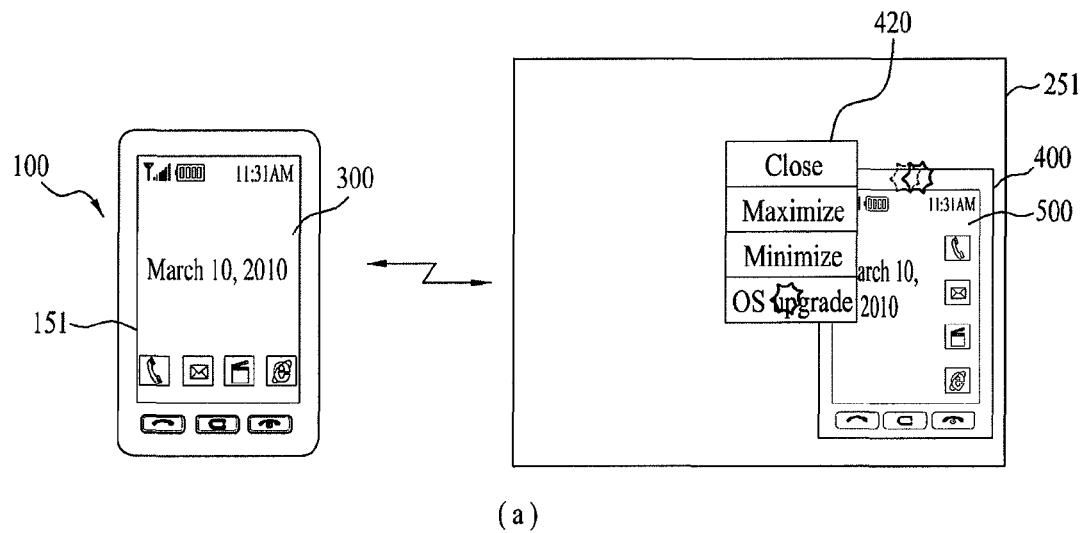
(a)
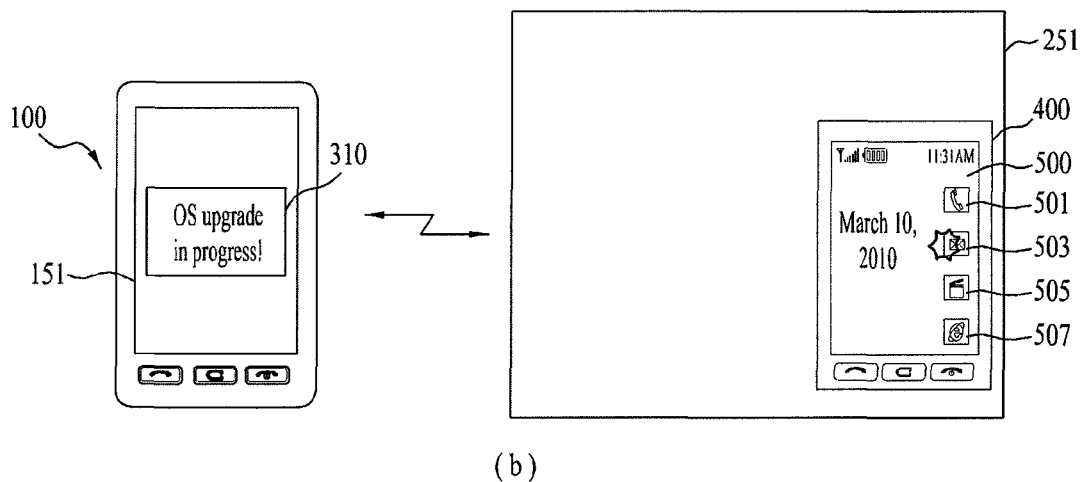
(b)
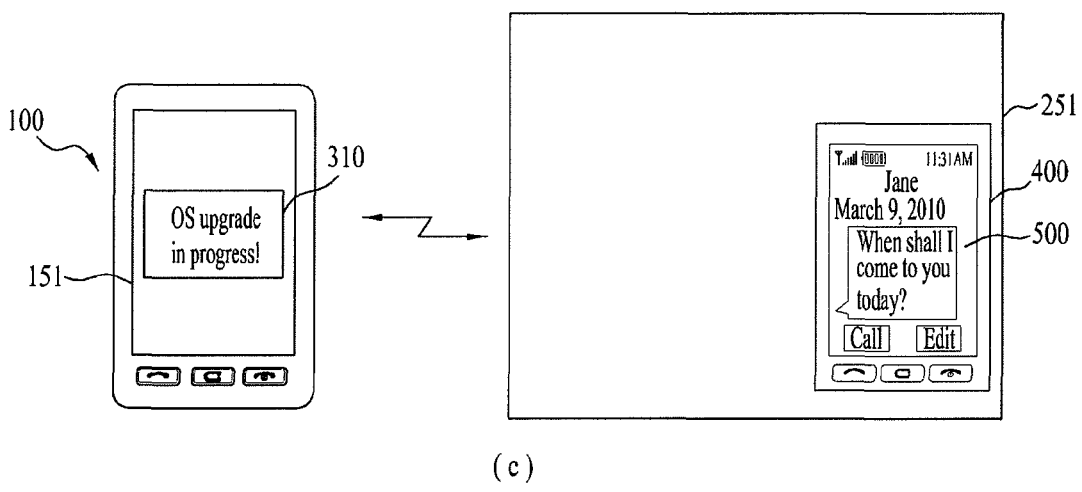
(c)

MOBILE TERMINAL, DISPLAY DEVICE AND CONTROLLING METHOD THEREOF

Pursuant to 35 U.S.C. §119(a), this application claims the benefit of earlier filing date and right of priority to International Patent Application No. PCT/KR2010/006820, filed on Oct. 6, 2010, the contents of which are hereby incorporated by reference herein in their entirety.

BACKGROUND OF THE INVENTION

1. Field of the Invention

The present invention relates to a mobile terminal, and more particularly, to a mobile terminal, display device and controlling method thereof. Although the present invention is suitable for a wide scope of applications, it is particularly suitable for enabling data communications between a mobile terminal and a display device in case of connecting the mobile terminal and the display device together in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The mobile terminal can be connected to such a display device as a notebook computer, a tablet computer, a personal computer, a television set and the like by wire or wireless and is then able to perform data communications in-between. As data communications are performed between the mobile terminal and the display device, demand for a method of displaying information on the data communications in-between on the mobile terminal and/or the display device rises in further consideration of a terminal user's convenience.

SUMMARY OF THE INVENTION

Accordingly, the present invention is directed to a mobile terminal, display device and controlling method thereof that substantially obviate one or more problems due to limitations and disadvantages of the related art.

An object of the present invention is to provide a mobile terminal, display device and controlling method thereof, by which when the data communications are performed between the mobile terminal and the display device, information on the data communications in-between can be displayed on the mobile terminal and/or the display device in further consideration of terminal user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes: a memory unit configured to store a software; a first display unit configured to display a first screen image; an interface unit configured to be connected to an external display device having a second display unit; and a controller configured to display the first screen image corresponding to the software of a first version on the first display unit if the software is executed, and to control a second screen image according to the software of a second version to be displayed on the second display unit if connected to the external display device.

In another aspect of the present invention, a display device according to an embodiment the present invention includes: an interface unit configured to be connected to an external mobile terminal having a memory unit configured to store a software and a first display unit configured to display a first screen image; a second display unit; and a controller configured to, in response to a connection to the external mobile terminal having the first screen image according to the software of a first version displayed thereon according to an execution of the software, display a second screen image according to the software of a second version on the second display unit.

In another aspect of the present invention, a method of controlling a mobile terminal includes: displaying a first screen image according to a software of a first version on a first display unit provided to the mobile terminal, when the software is executed in the mobile terminal; connecting the mobile terminal to an external display device having a second display unit; and in response to a connection between the mobile terminal to the external display device, controlling a second screen image according to the software of a second version to be displayed on the second display unit.

In a further aspect of the present invention, a method of controlling a display device includes: connecting an external mobile terminal having a first display unit configured to display a first screen image to the display device having a second display unit; and in response to a connection between the display device and the external mobile terminal displaying the first screen image according to a software of a first version when the software is executed in the external mobile terminal, controlling a second screen image according to the software of a second version to be displayed on the second display unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is diagram of screen configurations of the mobile terminal and the display unit of the display device according to an embodiment of the present invention;

FIGS. 7a-c and FIGS. 8a-b are diagrams of screen configurations of the mobile terminal and the display unit of the display device according to an embodiment of the present invention;

FIGS. 11a-c are diagrams of screen configurations of the mobile terminal and the display unit of the display device according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, portable multimedia players (PMP), navigators and the like.

However, by way of non-limiting example only, further description will be with regard to a mobile terminal 100 such as the mobile phone or the smart phone, and it should be noted that such teachings may apply equally to other types of terminals.

Figure 1:
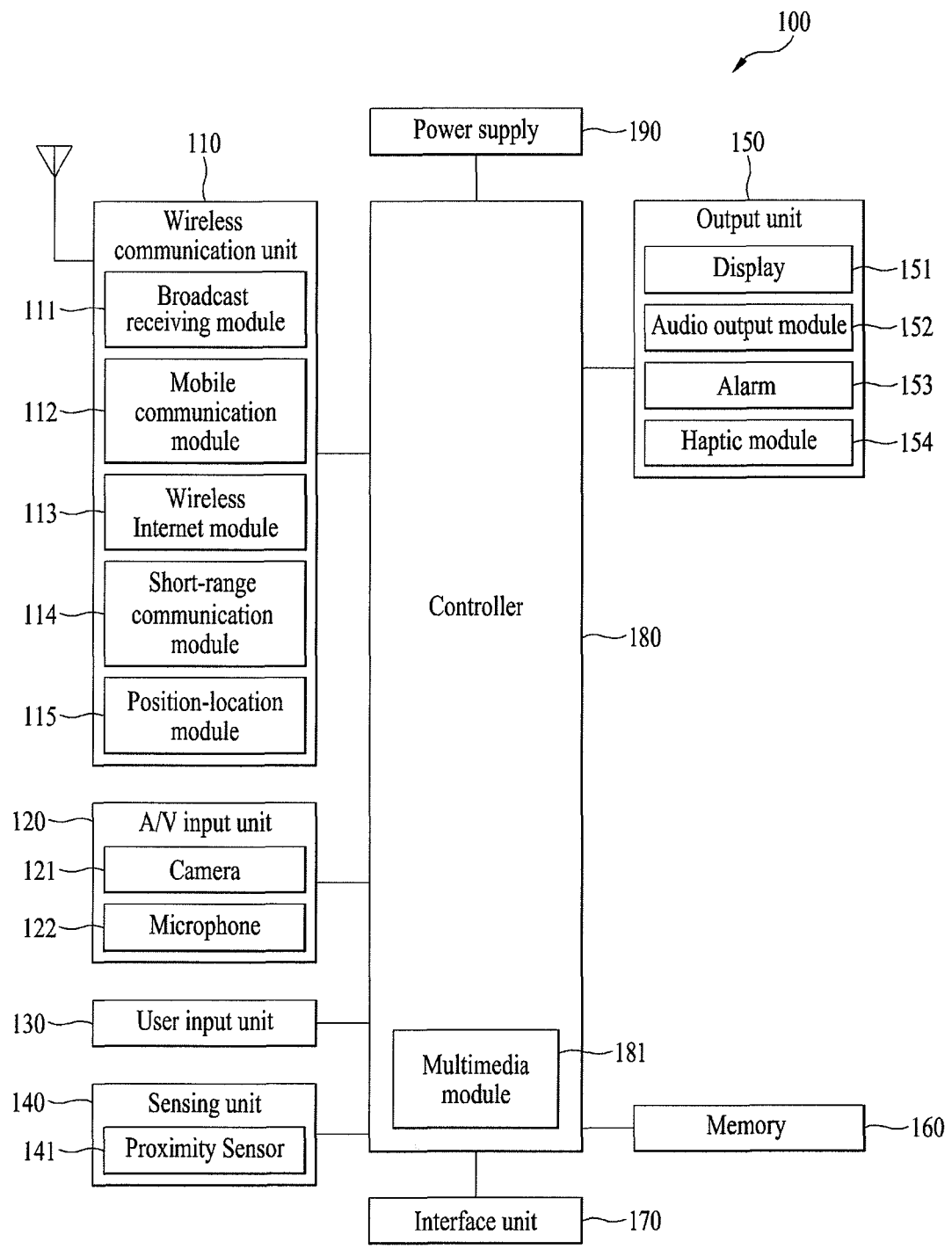
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence. First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. The broadcast associated information can be provided via a mobile communication network. In this case, the broadcast associated information can be received by the mobile communication module 112.

The mobile communication module 112 transmits/receives wireless signals to/from one or more network entities (e.g., base station, external terminal, server, etc.) via a mobile communication network such as (but not limited to) GSM (Global System for Mobile communications), CDMA (Code Division Multiple Access), and WCDMA (Wideband CDMA). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include (but not limited to) WLAN (Wireless LAN) (Wi-Fi), Wibro (Wireless broadband), Wimax (World Interoperability for Microwave Access), HSDPA (High Speed Downlink Packet Access) GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

Further, the short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information is calculated using three satellites, and errors of the calculated location position and time information is then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151. The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. For example, the sensing unit includes at least one of a gyroscope sensor, acceleration sensor, a geomagnetic sensor and the like. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

In addition, at least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), the display 151 is able to be used as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor is able to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

Further, the proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, the touchscreen is configured to detect the proximity of a pointer using a variation of electric field according to the proximity of the pointer. In this case, the touchscreen (touch sensor) can be classified as the proximity sensor.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160.

In the memory 160, software according to each of at least two versions can be stored together. For example, software according to each of at least two versions can include OS (operating system) software and the like. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

Considering that the wireless internet module 113 and the short-range communication module 114 are usable as the wireless data ports, each of the wireless internet module 113 and the short-range communication module 114 can be understood as a sort of the interface unit 170.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

In the above description, so far, the mobile terminal according to the present invention is described. In the following description, a display device according to the present invention is explained. First of all, no limitation is put on a display device described in this disclosure unless the display device is able to receive and display information on a display of the mobile terminal by being connected to the mobile terminal for communications in-between. For example, the display device can include one of a notebook computer (laptop), a tablet computer, a desktop computer, a television set (e.g., a digital TV set, a smart TV set, etc.) and the like.

Figure 2:
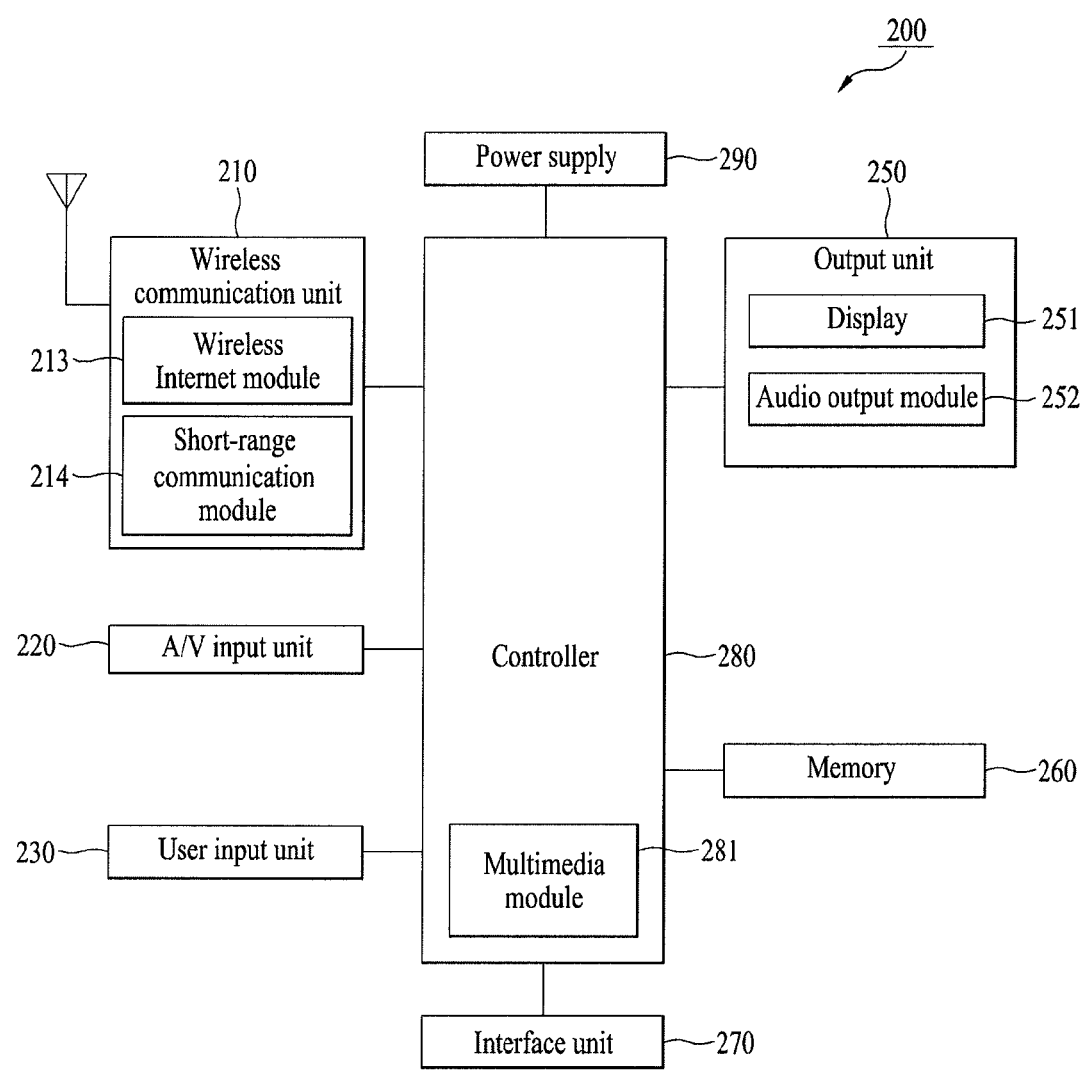
FIG. 2 is a block diagram of a display device according to one embodiment of the present invention.

FIG. 2 is a block diagram of a display device according to one embodiment of the present invention. Referring to FIG. 2, a display device 200 according to one embodiment of the present invention includes a wireless communication unit 210, an A/V (audio/video) input unit 220, a user input unit 230, an output unit 250, a memory 260, an interface unit 270, a controller 280, a power supply unit 290 and the like.

The wireless communication unit 210 can include a wireless internet module 213 and a short-range communication module 214, and output unit 250 can include a display unit 251 and an audio output module 253. Because the components of the display device 200 are identical or mostly similar to the corresponding components of the above-described mobile terminal, their details shall be omitted from the following description for clarity of this disclosure.

Also, because the components shown in FIG. 2 are not mandatory, more or less components can be implemented for the display device. For instance, when the display device 200 is a television, the device can further include a broadcast receiving module. Moreover, when the display device 200 is the television, the device may not include the wireless internet module. Of course, the display device 200 can include the wireless internet module. In addition, because the broadcast receiving module is identical or mostly similar to the former broadcast receiving module 111 of the mobile terminal 100 described with reference to FIG. 1, its detail shall be omitted from the following description for clarity of this disclosure.

Figure 3:
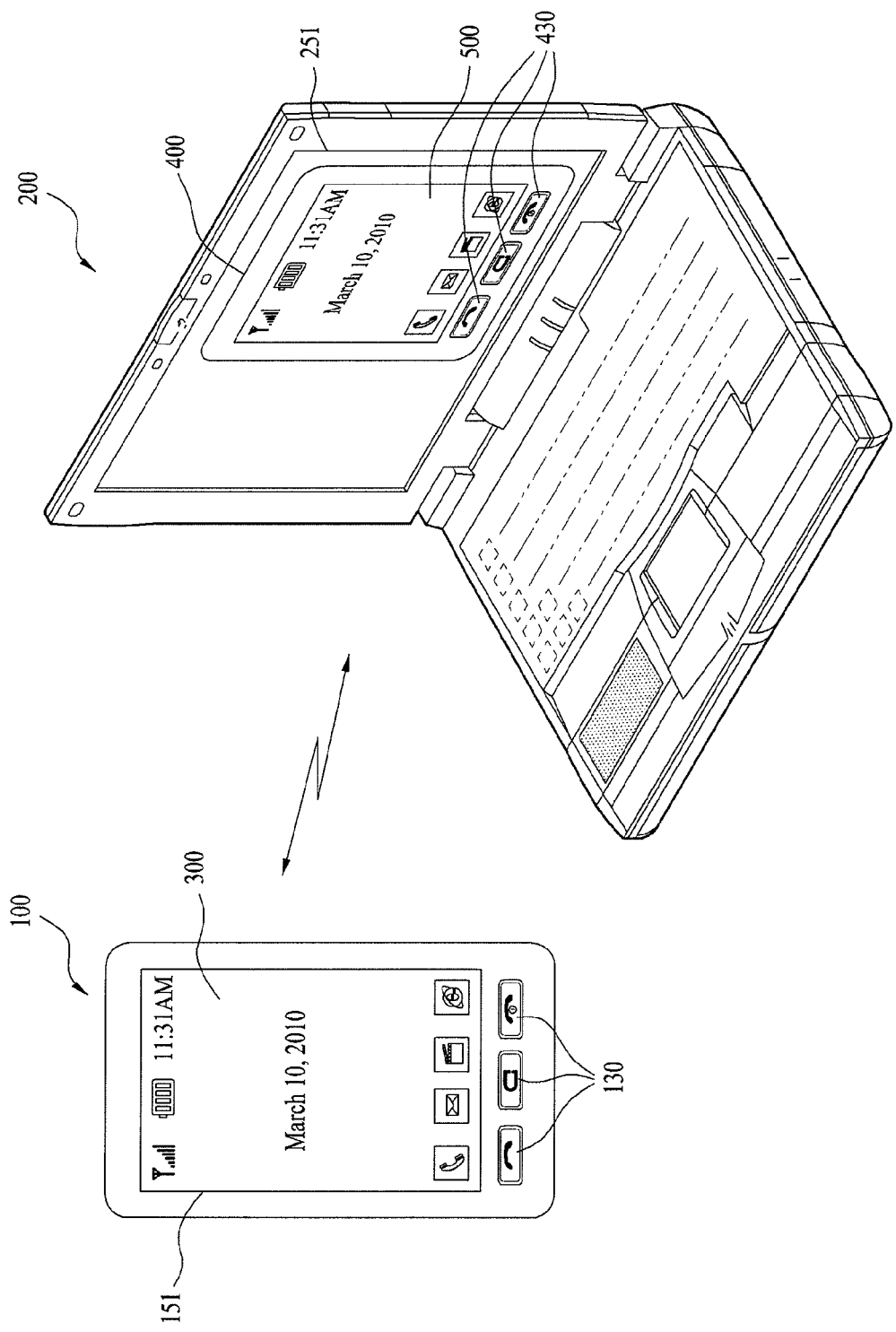
FIG. 3 is a diagram of a mobile terminal and a display device connected to each other to implement an embodiment of the present invention.

How to connect the mobile terminal 100 and the display device 200 together will now be explained with reference to FIG. 3 which is is a diagram of a mobile terminal and a display device connected to each other to implement an embodiment of the present invention. Referring to FIG. 3, the mobile terminal 100 and the display device 200 can be connected to each other via the interface unit 170 of the mobile terminal 100 and the interface unit 270 of the display device 200. The connection between the mobile terminal 100 and the display device 200 can be established by wire communication or wireless communication (e.g., short-range communication, wireless internet communication, etc.).

In FIG. 3, a state that the mobile terminal 100 and the display device 200 are connected to each other is shown. For clarity and convenience of the following description, in order to respectively identify the components of the mobile terminal 100 and the display device 200, 'first' shall be prefixed to the components of the mobile terminal 100, while 'second' shall be prefixed to the components of the display device 200.

For instance, the display unit 151 of the mobile terminal 100 is named a first display unit 151, the controller 180 of the mobile terminal 100 is named a first controller 180, the display unit 251 of the display device 200 is named a second display unit 251, and the controller 280 of the display device 200 is named a second controller 280. And, an image displayed on the first display unit 151 shall be named a first screen image 300.

Once the connection between the mobile terminal 100 and the display device 200 is established, the mobile terminal 100 is able to provide information on a first screen image displayed on the first display unit 151 to the display device 200. In this instance, an application (e.g., a plug-in software, etc.) for processing the information on the first screen image received from the mobile terminal 100 can be installed at the display device 200 in advance.

Hence, when the mobile terminal 100 and the display device 200 are connected to each other, the second controller 280 of the display device 200 is able to display a monitor window 400 for the first screen image 300 on the second display unit 251. The second controller 280 of the display device 200 then controls an image corresponding to the first screen image to be displayed on the monitor window 400. For clarity of the following description, in order to discriminate this image from a first screen image 300 displayed in the mobile terminal 100, the image displayed on the monitor window 400 shall be named a second screen image 500.

In particular, the monitor window 400 can have a shape identical or similar to one face of a housing to which the first display unit 151 of the mobile terminal 100 is attached. Therefore, when prescribed key buttons 130 are provided to the face of the housing, soft key buttons 430 having the same shapes of the prescribed key buttons can be formed at corresponding locations.

When the soft key button 430 is clicked by a mouse in the display device 200 (or the soft key button 430 is touched when the second display unit 251 includes a touchscreen), the second controller 280 of the display device 200 is able to send a control signal, which indicates that the soft key button 430 as been manipulated in the display device 200, to the mobile terminal 100. If so, the first controller 180 of the mobile terminal 100 receives the control signal and is then able to execute a specific function corresponding to the manipulation of the prescribed key button 130 matching the manipulated soft key button 430 in the mobile terminal 100.

And, the first controller 180 of the mobile terminal 100 is able to control an image according to the executed specific function to be displayed as the first screen image 300 on the first display unit 151. Subsequently, the first controller 180 of the mobile terminal 100 is able to send information on the first screen image 300, which includes the image according to the executed specific function, to the display device 200. If so, the second controller 280 of the display device 200 is able to control the second screen image 500 corresponding to the received first screen image 300 to be displayed on the monitor window 400.

In particular, a user is able to indirectly directly manipulate the mobile terminal 100 by manipulating the monitor window 400 of the display device 200 instead of manipulating the mobile terminal 100. And, the user is able to view the first screen image 300 of the mobile terminal 100 via the second screen image 500 of the display device 200.

It is not mandatory for the monitor window 400 to have a shape identical or similar to one face of the housing having the first display unit 151 of the mobile terminal 100 loaded thereon. For instance, other icons such as a window close icon, a window minimize icon, a window maximize icon, etc. can also be shown in the monitor window 400 in addition to one face of the housing. Alternatively, the second screen image 500 can be displayed on the monitor window 400 without the shape of the housing face.

The display device 200 receives information on the first screen image 300 from the mobile terminal 100 and then displays the received information as the second screen image 500 on the monitor window 400. Therefore, the first screen image 300 and the second screen image 500 can share a content image generated from the mobile terminal 100 with each other.

FIG. 3 exemplarily shows that the content image generated from the mobile terminal 100 is a standby image, by which the present embodiment is non-limited. The content image generated from the mobile terminal 100 includes an image related to every function, menu or application executed in the mobile terminal 100.

In the following description, how the mobile terminal 100 provides the information on the first screen image to the display device 200 is explained in detail. First of all, the first controller 180 of the mobile terminal 100 captures the first screen image 300 displayed on the first display unit 151 and then transmits the captured first screen image as the aforesaid information on the first screen 300 to the display device 200. Afterwards, the second controller 280 of the display device 200 receives the captured first screen image 300 and then controls the received first screen image to be displayed as the second screen image 500 on the monitor window 400.

In doing so, the first screen image 300 and the second screen image 500 can depend on each other in case of zoom-in or zoom-out for example. In particular, if the first screen image 300 zooms in or out, the second screen image 500 can correspondingly zoom in or out. Moreover, contents of the first and second screen images 300 and 500 can become dependent on each other.

The first controller 180 of the mobile terminal 100 is able to transmit a video signal input to the first display unit 151 to the display device 200 as the information on the first screen image 300. The first display unit 151 of the mobile terminal 100 is then able to output the video signal as the first screen image 300. Meanwhile, the second controller 280 of the display unit 200 receives the transmitted video signal and is then able to output the received video signal as the second screen image 500 to the monitor window 400 of the second display unit 251. In particular, the first display unit 151 and the second display unit 251 can share the video signal output from the first controller 180 with each other. In the following description, the video signal shall be named a shared video signal.

The first screen image 300 and the second screen image 500 can depend on each other in case of zoom-in or zoom-out for example. In particular, if the first screen image 300 zooms in or out, the second screen image 500 can correspondingly zoom in or out. Moreover, contents of the first and second screen images 300 and 500 can become dependent on each other.

The first controller 180 of the mobile terminal 100 generates a first video signal about a specific content image (or a home screen image) generated from the mobile terminal 100 and a second video signal independent from the first video signal. The first controller 180 inputs the first video signal to the first display unit 151 and is able to transmit the second video signal as the information on the first screen image to the display device 200.

The first display unit 151 of the mobile terminal 100 is then able to output the first video signal as the first screen image 300. Meanwhile, the second controller 280 of the display device 200 receives the transmitted second video signal and is then able to output the received second video signal as the second screen image 500 on the monitor window 400 of the second display unit 251.

Besides, it should be understood that each of the first and second video signals should be discriminated from the shared video signal in that the first video signal and the second video signal are independently provided to the first display unit 151 and the second display unit 251, respectively.

The first screen image 300 and the second screen image 500 can be independent from each other in zoom-in and zoom-out for example. In particular, the second screen image 500 can zoom in or out irrespective of the zoom adjustment of the first screen image 300. Moreover, the first screen image 300 and the second screen image 500 can become independent from each other in their contents. In particular, the first screen image 300 and the second screen image 500 can be different from each other at least in part.

The second video signal may be a video signal capable of implementing a complete second screen image or a video signal for a partial image element required for implementing the complete second screen image. In the latter case, the second controller 280 of the display device 200 is able to implement the complete second screen image in a manner of receiving the second video signal and then mixing the received second video signal with other image element(s).

In the above description, assuming that the mobile terminal 100 and the display device 200 are connected to each other, the first screen image 300 displayed on the first display unit 151 and the monitor window 400 and the second screen image 500 displayed on the second display unit 251 are schematically explained.

In the following description, when the mobile terminal 100, in which a prescribed software is executed, is connected to the display device 200, an image generated by a first version of the software may be displayed as a first screen image on the first display unit and an image generated by a second version of the software is displayed as a second screen image on the second display unit. This is explained in detail with reference to FIG. 4 and FIG. 5 as follows.

Software executed in the mobile terminal 100 according to the present embodiment is not limited to a specific software. For instance, the software executed in the mobile terminal 100 can include one of an OS (operating system) software, a game software, a utility software, an application software and the like. For clarity of the following description, it is assumed that the software executed in the mobile terminal 100 includes the OS software.

In the following description, both the first display unit 151 of the mobile terminal 100 and the second display unit 251 of the display device 200 can include touchscreens, respectively. Yet, the embodiment of the present invention is applied not only to the case that the first and second display units 151 and 251 include the touchscreens but to the case that the first and second display units 151 and 251 include normal displays.

Figure 4:
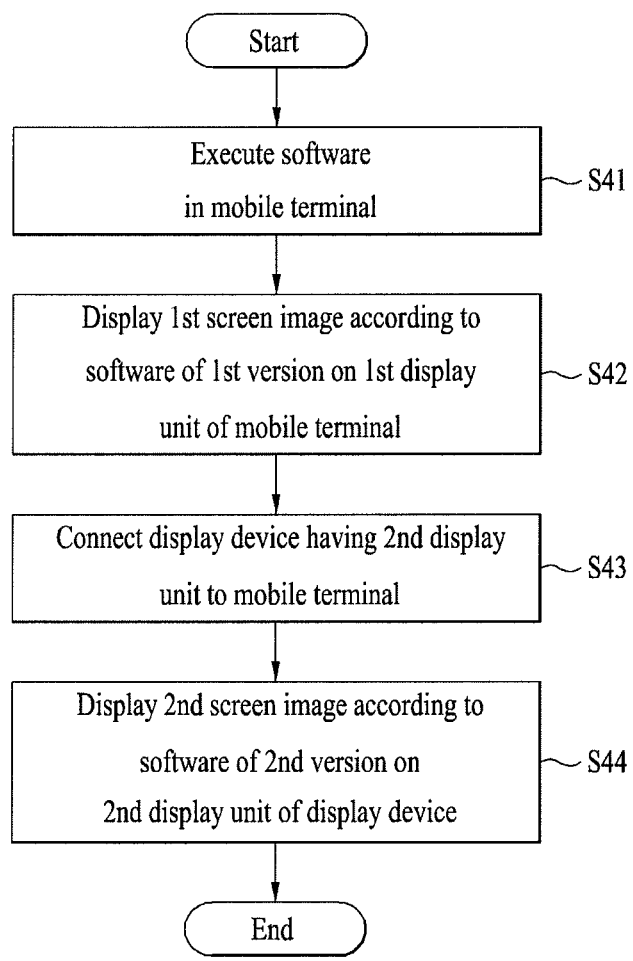
FIG. 4 is a flowchart for implementing an embodiment of the present invention.

FIG. 4 is a flowchart for implementing an embodiment of the present invention. And, FIG. 5 is diagram of screen configurations of the mobile terminal and the display unit of the display device according to an embodiment of the present invention.

Referring to FIG. 4, the first controller 180 of the mobile terminal 100 is able to control a first version OS to be executed [S41]. In doing so, the first version OS is directly executable without inputting a user command when a power of the mobile terminal 100 is turned on.

The first controller 180 of the mobile terminal 100 is able to control a home screen image according to the first version OS, as shown in FIG. 5, to be displayed as a first screen image 300 on the first display unit 151 [S42]. In this case, at least one object (e.g., a menu icon, an application icon, a widget, etc.) can be displayed on the home screen image.

The mobile terminal 100 can be connected to the display device 200 [S43]. Because the connection between the mobile terminal 100 and the display device 200 is explained in the foregoing description, its details shall be omitted from the following description for clarity of this disclosure.

The first controller 180 of the mobile terminal 100 is able to provide the display device 200 with information about the home screen image of the first version OS as the first screen image. The second controller 280 of the display device 200 receives the information about the home screen image of the first version OS and is then able to control a home screen image of a second version OS corresponding to the home screen image of the first version OS to be displayed as a second screen image 500 on the monitor window 400 of the second display unit 251 [S44].

Figure 6:
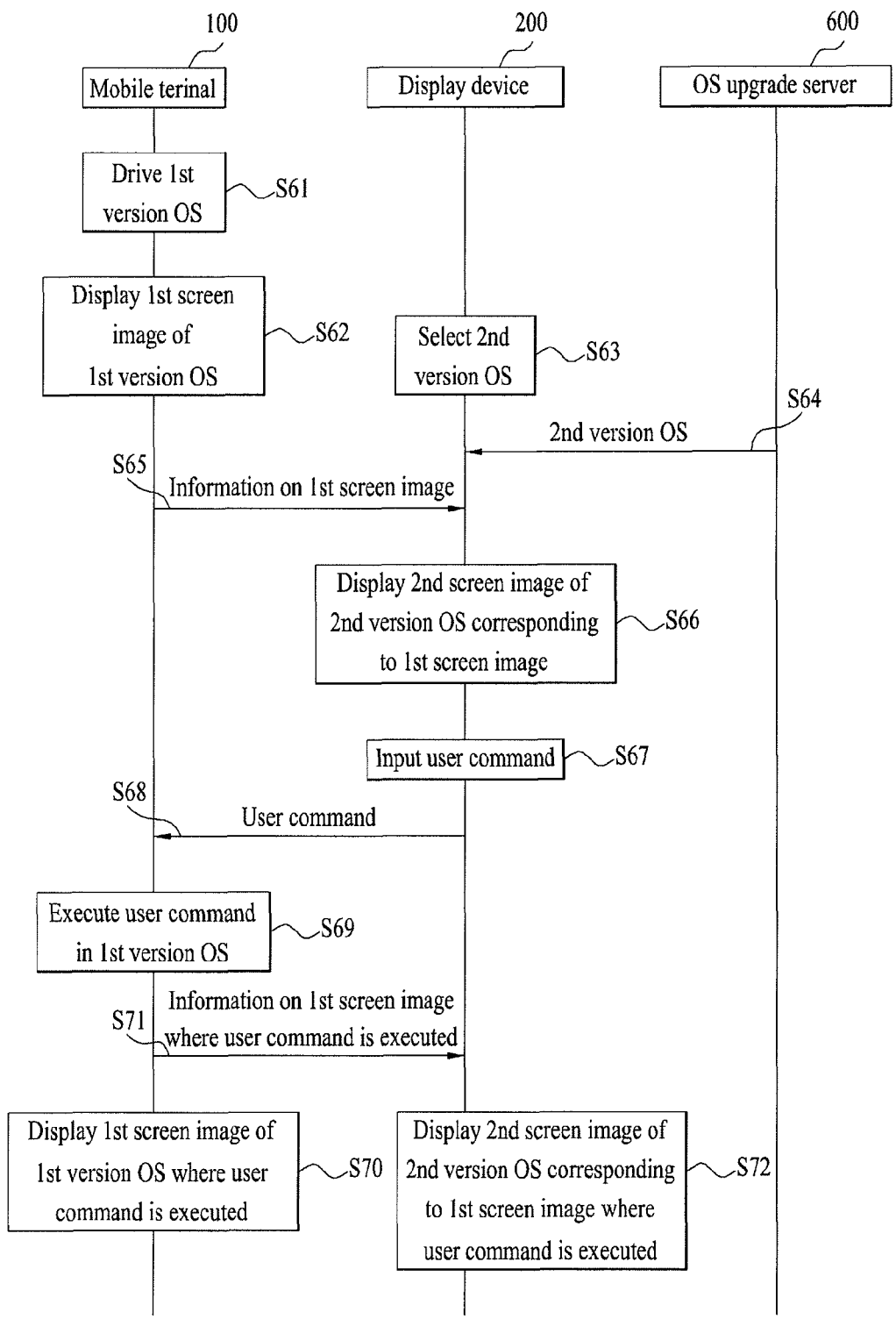
FIG. 6 is a flowchart for implementing an embodiment of the present invention.

In the following description, how the home screen image of the second version OS is displayed as the second screen image 500 on the second display unit 251 is explained in detail with reference to FIGS. 6 to 8. FIG. 6 is a flowchart for implementing an embodiment of the present invention. And, FIG. 7 and FIG. 8 are diagrams of screen configurations of the mobile terminal and the display unit of the display device according to an embodiment of the present invention.

Referring to FIG. 6, as mentioned in the foregoing description, the first version OS is executed in the mobile terminal 100 [S61]. A home screen image according to the first version OS can be displayed as the first screen image 300, as shown in FIG. 7a, on the first display unit 151 of the mobile terminal 100 [S62].

When the mobile terminal 100 and the display device 200 are connected to each other, referring to FIG. 7b, the second controller 280 of the display device 200 is able to control an OS version option window 410 for selecting a version of the OS for the second screen image to be displayed on the second display unit 251 of the display device 200.

In particular, when the mobile terminal 100 and the display device 200 are connected to each other, the second controller 280 of the display device 200 accesses an OS upgrade server 600 for the mobile terminal 100 via the internet and is then able to recognize whether a newer version of the OS is available.

If a different version of the OS is available, such as a newer version, the second controller 280 of the display device 200 controls a current version option of the mobile terminal 100 and the new version option for the mobile terminal 100 to be displayed as the OS versions for the second screen image on the OS version option window 410 and then enables a terminal user to select one of them.

Subsequently, the terminal user is able to select either the current version option or the new version option [S63]. And, it is apparent to those skilled in the art that a specific one of the options can be selected via an appropriate manipulation of the user input unit 230 or a touch to the OS version option window 400. For clarity of this disclosure, details of such an option selection shall be omitted from the following description.

Meanwhile, if a newer version of the OS is available, the second controller 280 of the display device 200 is able to control the new version to be automatically selected for the second screen image without displaying the OS version option window 410.

If a newer version of the OS is not available, the second controller 280 of the display device 200 is able to control the OS of the current version to be selected for the second screen image without displaying the OS version option window 410.

In the following description, assume that the OS of the new version (hereinafter named a second version OS) is selected for the second screen image. If the second version OS is selected for the second screen image, the second controller 280 of the display device 200 is ale to control the second version OS to be downloaded from the OS upgrade server 600 [S64]. In this case, the display device 200 is able to download the whole second version OS or is able to selectively download a necessary portion of the second version OS in part.

When downloading the necessary portion of the second version OS, the second controller 280 of the display device 200 is able to control another necessary portion of the second version OS to be downloaded in a manner of accessing the OS upgrade server 600 each time the corresponding portion is needed. The following description is made with reference to FIG. 6 on the assumption that the display device 200 receives the whole second version OS.

Meanwhile, the first controller 180 of the mobile terminal 100 is able to provide the information on the home screen image of the first version OS as the first screen image to the display device 200 [S65].

The second controller 280 of the display device 200 is able to receive the information on the home screen image of the first version OS from the mobile terminal 100. The second controller 280 of the display device 200 is able to control a home screen image of a second version OS corresponding to the home screen image of the first version using the downloaded second version OS. In particular, the second controller 280 of the display device 200 is able to control the home screen image of the first version OS to be converted to the home screen image of the second version OS using the downloaded second version OS. The second controller 280 of the display device 200 is able to control the home screen image of the second version OS to be displayed as a second screen image 500, as shown in FIG. 7b on the monitor window 400 of the second display unit 251 [S66].

Referring to FIG. 7b at least one or more objects 301, 303, 305 and 307 for the content image can be displayed on the first screen image 300. For clarity of the following description, an object in the first screen image shall be named a first object And, objects 501, 503, 505 and 507 respectively corresponding to the first objects 301, 303, 305 and 307 can be displayed on the second screen image 500. For clarity of the following description, an object in the second screen image shall be named a second object.

Because the first screen image and the second screen image are the home screen image of the first version OS and the home screen image of the second version OS, respectively, FIG. 7b exemplarily shows that position configuration of the first objects in the first screen image may differ from that of the second objects in the second screen image.

Again referring to FIG. 7b a user command for selecting a message menu object 503 from the second objects displayed on the second screen image 500 of the display device 200 may be input [S67]. In this case, the user command for selecting the message menu object 503 in the display device 200 can be input in a manner of performing an appropriate manipulation of the second user input unit 230 (e.g., clicking the message menu object using a mouse) or touching the second display unit 251 if the second display unit 251 is a touchscreen.

The second controller 280 of the display device 200 is able to transmit a control signal that the user command for selecting the message menu object has been input in the second screen image 200 to the mobile terminal [S68]. In response to the control signal, the first controller 180 of the mobile terminal 100 is then able to control the user command to be executed in the first version OS [S69]. In particular, the first controller 180 of the mobile terminal 100 is able to control the message menu to be executed in the first version OS.

Referring now to FIG. 7c, the first controller 180 of the mobile terminal 100 is able to control a message menu image of the first version OS to be displayed as the first screen image 300 on the first display unit 151 [S70]. Meanwhile, the first controller 180 of the mobile terminal 100 is able to provide the display device 200 with the information on the message menu image of the first version OS as the information on the first screen image [S71].

The second controller 280 of the display device 200 is able to receive the information on the message menu image of the first version OS. The second controller 280 of the display device 200 is able to control a message menu image of a second version OS corresponding to the message menu image of the first version OS using the downloaded second version OS. In particular, the second controller 280 of the display device 200 is able to control the message menu image of the first version OS to be converted to the corresponding message menu image of the second version OS. And, the second controller 280 of the display device 200 is able to control the message menu image of the second version OS to be displayed as the second screen image 500, as shown in FIG. 7c, on the monitor window 400 of the second display unit 251 [S72].

When the mobile terminal 100 and the display device 200 are connected to each other, FIGS. 7a-c show that either the current version OS or the newer OS for the mobile terminal 100 can be selected for the second screen image of the display device 200, by which the present embodiment is non-limited. Alternatively, for the second screen image of the display device 200, one of any previously released operating system versions can be selected. This is explained in detail with reference to FIG. 8 as follows.

As mentioned in the foregoing description, the first version OS is executed in the mobile terminal 100 [S61]. And, referring to FIG. 8a, a home screen image according to the first version OS can be displayed as a first screen image 300 on the first display unit 151 of the mobile terminal 100 [S62]. When the mobile terminal 100 and the display device 200 are connected to each other, the second controller 280 of the display device 200 accesses the OS upgrade server 600 for the mobile terminal 100 via the internet for example, receives information on all available versions of the OS for the mobile terminal 100 and is then able to control all the currently released versions, as shown in FIG. 8a, to be displayed in the OS version option window 410 on the second display unit 251.

In particular, in a manner that the respective options for all the previously released versions for the mobile terminal 100 are displayed on the OS version option window 410, a terminal user is able to select one of the displayed options as the version of the OS for the second screen image.

The current version option (i.e., this option corresponds to the first version OS) of the mobile terminal 100 can be displayed on the OS version option window 410 to be visually distinguished from the rest of the version options. The terminal user is then able to select one of the various options in the OS version option window 410 [S63]. In particular, any version upgraded after the release of the first version OS is selectable. And, any OS version before the release of the first version OS can be selected as well.

In the following description, the OS of the version selected for the second screen image shall be named a second version OS. Once the second version OS is selected for the second screen image, the second controller 280 of the display device 200 is able to control the second version OS to be downloaded from the OS upgrade server 600 [S64].

The first controller 180 of the mobile terminal 100 is able to provide the display device 200 with the information on the home screen image of the first version OS as the information on the first screen image [S65].

The second controller 280 of the display device 200 receives the information on the home screen image of the first version OS and is able to control a home screen image of a second version OS corresponding to the home screen image of the first version OS to be generated using the downloaded second version OS.

Referring to FIG. 8b, the second controller 280 of the display device 200 is able to control the home screen image of the second version OS to be displayed as the second screen image 500 on the monitor window 400 of the second display unit 251 [S66]. A user command is input via the second screen image 500 of the display device 200 and the first and second screen images 300 and 500 are changed according to the input user command. This is explained in the foregoing description and its details shall be omitted from the following description for clarity of this disclosure.

In the above description, the display device 200 downloads the second version OS from the OS upgrade server 600 and then displays the second screen image 500 of the second version OS on the second display unit 251, by which the present embodiment is non-limited. For instance, both of the first version OS and the second version OS are stored in the mobile terminal. And, the display device 200 then receives the second screen image of the second version OS from the mobile terminal 100. This is explained in detail with reference to FIG. 9 as follows.

Figure 9:
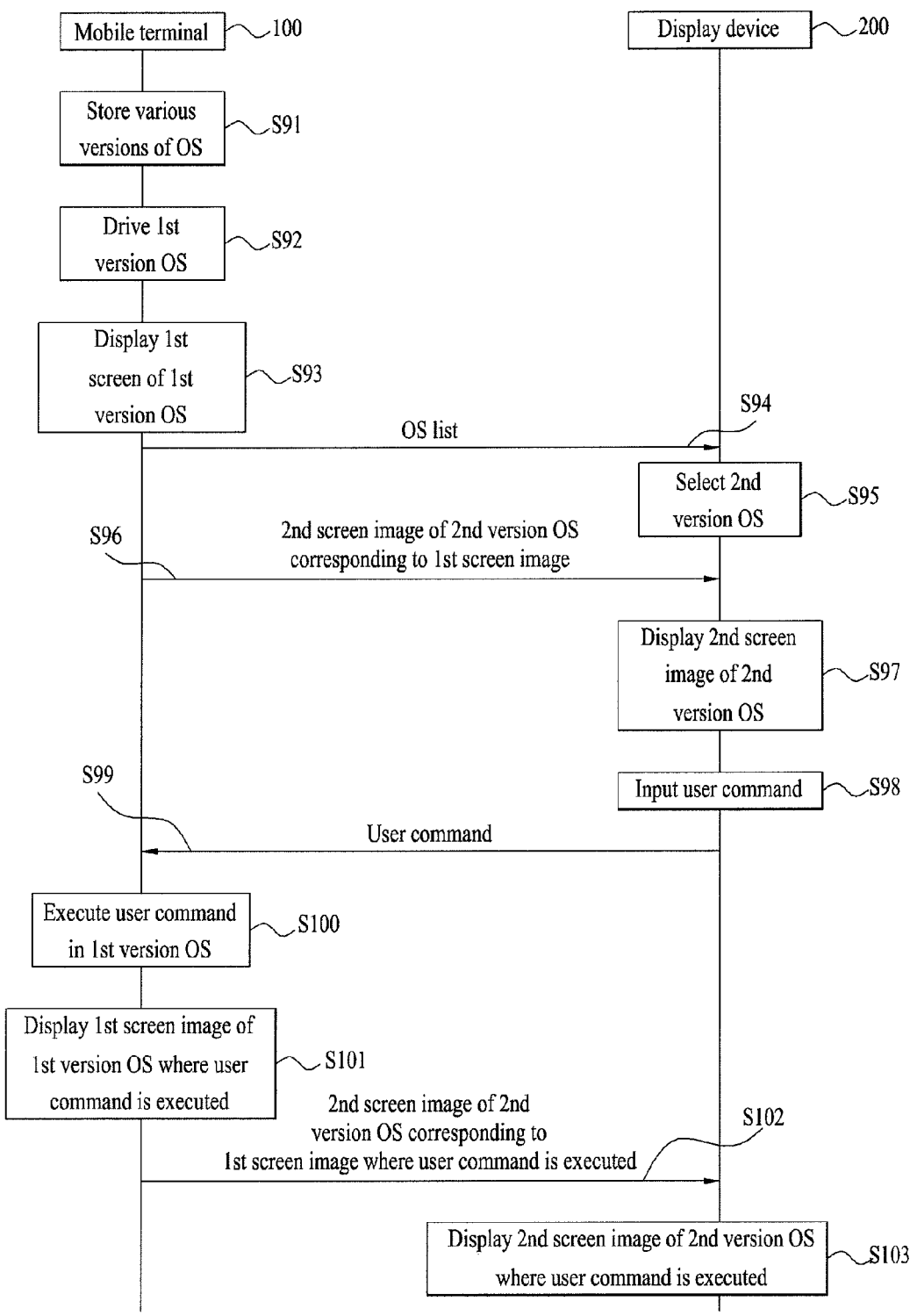
FIG. 9 is a flowchart for implementing an embodiment of the present invention.

FIG. 9 is a flowchart for implementing an embodiment of the present invention, which depicts a first version OS and a second version OS can be stored in the first memory unit 160 of the mobile terminal 100 in advance [S91]. The first version OS of the two versions of OS is executed in the mobile terminal 100 [S92]. A home screen image of the first version OS can be displayed as a first screen image 300 on the first display unit 151 of the mobile terminal 100 [S93]. When the mobile terminal 100 and the display device 200 are connected to each other, the first controller 180 of the mobile terminal 100 is able to provide a list of the first version and the second version OS stored in the memory unit 160 [S94].

The second controller 280 of the display device 200 is able to control the OS version option window for selecting the version of the OS for a second screen image to be displayed on the second display unit 251. The following description continues on the assumption that the second version OS is selected for the second screen image [S95]. It is not mandatory for the OS version option window to be provided by the second display unit 251. When the second version OS is previously set to be used for the second screen image, the step S94 and the step S95 can be skipped.

The first controller 180 of the mobile terminal 100 is able to provide information on the home screen image of the second version OS corresponding to the home screen image (i.e., the first screen image) of the first version OS to the display device 200 as the information on the first screen image [S96].

The second controller 280 of the display device 200 receives the information on the home screen image of the second version OS and is then able to control the home screen image of the second version Os to be displayed as the second screen image on the monitor window 400 of the second display unit 251 [S97]. In particular, the display device 200 receives the information on the second screen image of the second version corresponding to the first screen image of the first version from the mobile terminal 100.

Meanwhile, a prescribed user command can be input via the second screen image 500 of the display device 200 [S98]. The second controller 280 of the display device 200 is able to transmit a control signal for indicating that the user command has been input in the second screen image 500 to the mobile terminal 100 [S99]. In response to the control signal, the first controller 180 of the mobile terminal 100 is able to control the user command to be executed in the first version OS [S100].

Referring back to FIG. 7c, the first controller 180 of the mobile terminal 100 is able to control the image of executing the user command in the first version OS to be displayed as the first screen image 300 on the first display unit 151 [S101]. The first controller 180 of the mobile terminal 100 is able to provide the display device 200 with information on the second screen image of the second version OS corresponding to the image of executing the user command of the first version OS [S102].

The second controller 280 of the display device 200 receives the information on the second screen image of the second version OS and is able to control the screen image of the second version OS to be displayed on the monitor window 400 of the second display unit 251 [S103].

In the following description, how the mobile terminal 100 upgrades a first version OS into a second version OS via the display device 200 is explained in detail with reference to FIG. 10 and FIG. 11. The display device 200 is explained with reference to FIG. 6 and FIG. 7, and it is assumed that the second version OS can be downloaded from the OS upgrade server 600.

Figure 10:
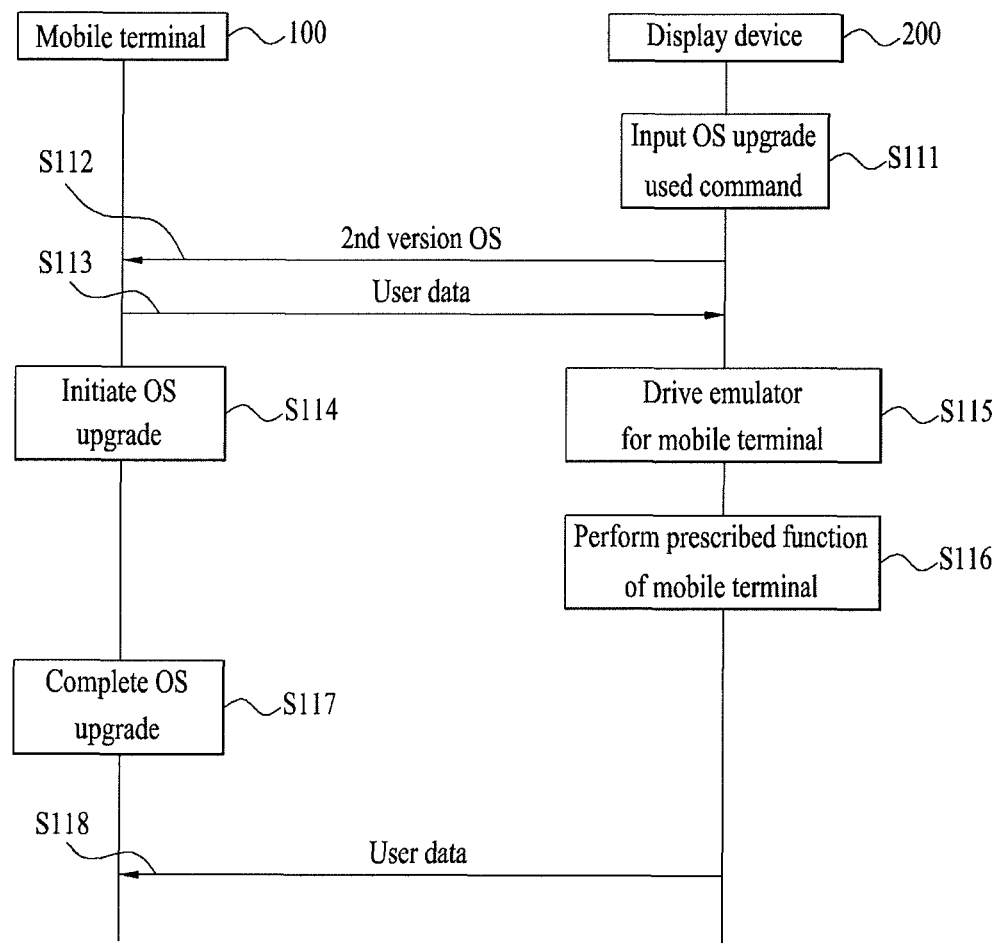
FIG. 10 is a flowchart for implementing an embodiment of the present invention.

FIG. 10 is a flowchart for implementing an embodiment of the present invention and FIGS. 11a-c are diagrams of screen configurations of the mobile terminal and the display unit of the display device according to an embodiment of the present invention.

Referring to FIG. 11a, a home screen image of a first version OS is displayed as a first screen image on the first display unit 151 of the mobile terminal 100, while a home screen image of a second version OS is displayed as a second screen image on the monitor window 400 of the second display unit 251 of the display device 200. This is described with reference to FIG. 6 and FIG. 7 and its details shall be omitted from the following description for clarity of this disclosure.

A user command for upgrading the first version OS into the second version OS for the mobile terminal 100 can be input to the display device 200 [S111]. FIG. 11a shows that a menu list window 410 is displayed on the second display unit 251 if the monitor window 400 is double touched. When an item 'OS upgrade' is selected from the menu list window 410, the user command for upgrading can be input.

The second controller 280 of the display device 200 downloads the second version OS from the upgrade server and is then able to transmit the downloaded second version OS to the mobile terminal [S112].

The first controller 180 of the mobile terminal 100 receives the second version OS. And, the first controller 180 of the mobile terminal 100 is able to back up user data (e.g., phonebook, call history list, message list, previously downloaded multimedia files such as music files, video files and the like, previously downloaded applications, etc.) stored in the first memory unit 160 to the display device [S113]. And, the first controller 180 of the mobile terminal 100 is able to perform an OS upgrade using the transmitted second version OS, as shown in FIG. 11b [S114].

The second controller 280 of the display device 200 is able to drive an emulator for the mobile terminal 100 [S115]. In this case, the emulator is previously stored in the second memory unit 260 of the display device 200 or can be downloaded from the OS upgrade server. In general, 'emulator' means the hardware and/or software that enables a first system to operate as a second system. Because the emulator is apparent to those skilled in the art, its details shall be omitted from the following description for clarity of this disclosure. The second controller 280 of the display device 200 is able to control the second screen image of the second version OS to be displayed on the monitor window 400 of the display unit 251 using the backed-up user data and the driven emulator, as shown in FIG. 11b, while the OS upgrade of the mobile terminal 100 is in progress. In particular, the second controller 280 of the display device 200 is able to control functions of the mobile terminal to be entirely or in part performed via the monitor window 400 in the course of the OS upgrade of the mobile terminal [S116].

For instance, a user command for selecting the message menu object 503 from the second objects displayed on the second screen image 500 of the display device 200 may be input. The second controller 280 of the display device 200 generates the message menu image of the second version OS using the driven emulator and the user data and is then able to control the generated message menu image to be displayed as the second screen image 500 on the monitor window 400 of the second display unit 251, as shown in FIG. 11c.

Meanwhile, the OS upgrade in the mobile terminal 117 can be completed [S117]. Once the OS upgrade is completed, the first controller 180 of the mobile terminal 100 is able to download the backed-up user data from the display device 200 [S118].

Accordingly, the present invention provides the following effects and/or advantages. First of all, according to at least one of embodiments of the present invention, when data communications are performed between the mobile terminal and the display device, information on the data communications between the mobile terminal and the display device can be displayed on the mobile terminal and the display device in further consideration of terminal user's convenience.

In particular, when a mobile terminal having a first display unit for executing a prescribed software is connected to a display device including a second display unit, a screen image of executing a first version of the software is displayed on the first display unit and a screen image of executing a second version of the software can be displayed on the second display unit. Therefore, it is advantageous that a user is able to experience different versions of the software simultaneously.

As mentioned in the foregoing description, the present invention is applicable to such a mobile terminal as a mobile phone, a smart phone, a notebook computer e.g., a laptop), a digital broadcast terminal, a PDA (personal digital assistants), a PMP (portable multimedia player), a navigation system and the like and/or such a display device as a notebook computer (e.g., laptop), a tablet computer, a desktop computer, a television set (e.g., a digital TV set, a smart TV set, etc.) and the like.

It will be apparent to those skilled in the art that various modifications and variations can be specified into other forms without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, the present invention covers the modifications and variations of this invention provided they come within the scope of the appended claims and their equivalents.

What is claimed is:

1. A mobile terminal comprising:
    a memory unit configured to store software;
    a first display unit configured to display a first screen image generated by a first version of the software;
    an interface unit configured to be connected to an external display device, the external display device configured to be controlled by a microprocessor and having a second display unit; and
    a controller configured to display the first screen image, and to control a second screen image corresponding to the first image, to be displayed on the second display unit when the interface unit is connected to the external display device, the second image being generated by a second version of the software,
    wherein the second screen image is displayed on the second display unit while the first screen image is displayed on the first display unit.

2. The mobile terminal of claim 1, wherein the controller is further configured to provide information about the first screen image to the external display device, and to control a monitor window to be generated on the second display unit, the monitor window displaying the second screen image corresponding to the first screen image.

3. The mobile terminal of claim 1, wherein the software comprises an OS (operating system) software for the mobile terminal.

4. The mobile terminal of claim 2, wherein the first version of the software and the second version of the software are stored in the memory unit.

5. The mobile terminal of claim 4, wherein the controller is further configured to provide information about the second screen image to the external display device.

6. The mobile terminal of claim 2, wherein the first version of the software and the second version of the software are the same version.

7. The mobile terminal of claim 6, wherein the controller is further configured to control the external display device to generate the second screen image by providing the external display device with the information about the first screen image ion.

8. The mobile terminal of claim 7, wherein when the mobile terminal is connected to the external display device, the controller is further configured to display a list of various versions for the software on the second display unit, and
    wherein the controller is further configured to control one of the various versions to be selected as the second version of the software.

9. The mobile terminal of claim 7, wherein when a user command is input via the monitor window for displaying the second screen image, wherein the controller is further configured to receive the input user command from the external display device and then to execute the received user command first version of the software.

10. The mobile terminal of claim 9, wherein the controller is further configured to control the first screen image to be changed in the first display unit in response to the user command, and
    wherein the controller is further configured to control the external display device to change the second screen image to correspond to the changed first screen image by providing the external display device with information about the changed first screen image.

11. A display device configured to be controlled by a microprocessor comprising:
    an interface unit configured to be connected to an external mobile terminal, the external mobile terminal having a memory unit configured to store a software and a first display unit configured to display a first screen image generated by a first version of software;
    a second display unit; and
    a controller configured to display a second screen image generated by a second version of the software corresponding to the first image on the second display unit in response to a connection to the external mobile terminal,
    wherein the second screen image is displayed on the second display unit while the first screen image is displayed on the first display unit.

12. The display device of claim 11, wherein the controller is further configured to receive information about the first screen image from the external mobile terminal and to control a monitor window for displaying the second screen image on the second display unit.

13. The display device of claim 11, wherein the software comprises an OS (operating system) software for the external mobile terminal.

14. The display device of claim 12, wherein the controller is further configured to control information about the second image received from the external mobile terminal.

15. The display device of claim 12, wherein the controller is further configured to receive the information about the first screen image to generate the second screen image.

16. The display device of claim 11, wherein when the display device is connected to the external mobile terminal, the controller is further configured to display a list of various versions for the software, and
    wherein the controller is further configured to select one of the various versions to be the second version of the software.

17. The display device of claim 11, wherein when a user command is input via the monitor window for displaying the second screen image, the controller is further configured to provide the input user command to the external mobile terminal and then to execute the user command received by the external mobile terminal in the first version of the software.

18. The display of claim 17, wherein when the first screen image is changed in the first display unit in response to the user command, the controller is further configured to receive information about the changed first screen image from the external mobile terminal and to control the second screen image to correspond to the changed first screen image.

19. A method of controlling a display device configured to be controlled by a microprocessor, comprising:
    connecting an external mobile terminal having a first display unit configured to display a first screen image generated by a first version of software to the display device having a second display unit; and
    displaying the first screen image when the software is executed in the external mobile terminal;
    controlling a second screen image generated by a second version of the software to be displayed on the second display unit, the second screen image corresponding to the first screen image; and
    displaying the second screen image on the second display unit while the first screen image is displayed on the first display unit.

* * * * *